(12) United States Patent
Euler (10) Patent No.: US 7,728,767 B2
(45) Date of Patent: Jun. 1, 2010

(54) PHASE AMBIGUITY RESOLUTION METHOD FOR A SATELLITE BASED POSITIONING SYSTEM

(75) Inventor: Hans-Jürgen Euler, Heerbrugg (CH)

(73) Assignee: Leica Geosystems AG, Heerbrugg (CH)

( * ) Notice: Subject to any disclaimer, the term of this patent is extended or adjusted under 35 U.S.C. 154(b) by 186 days.

(21) Appl. No.: 11/914,720

(22) PCT Filed: May 16, 2006

(86) PCT No.: PCT/EP2006/004610

§ 371 (c)(1),
(2), (4) Date: Dec. 20, 2007

(87) PCT Pub. No.: WO2006/122748

PCT Pub. Date: Nov. 23, 2006

(65) Prior Publication Data

US 2008/0204312 A1     Aug. 28, 2008

(30) Foreign Application Priority Data

May 18, 2005    (EP) .................................. 05104209

(51) Int. Cl.
*G01S 19/44* (2010.01)
*G01S 19/32* (2010.01)
(52) U.S. Cl. ................................................. 342/357.04
(58) Field of Classification Search ............. 342/357.04
See application file for complete search history.

(56) References Cited

U.S. PATENT DOCUMENTS 6,934,632 B2 * 8/2005 Hatch ........................ 701/213

7,256,730 B2 * 8/2007 Hernandez-Pajares et al. ..................... 342/357.03
7,432,853 B2 * 10/2008 Vollath ................... 342/357.04

OTHER PUBLICATIONS

Teunissen, P.J.G., "On the GPS Widelane and Its Decorrelating Property," Journal of Geodesy, (1997) 71:577-587.*
Forssell, B. et al, "Carrier Phase Ambiguity Resolution in GNSS-2," Proc. of the 10th Internatinal Tech. Meeting of the Sat. Division of ION, vol. 2, p. 1727-1736, Sep. 1997.*
Hatch, Ron et al, "Civilian GPS: The Benefits of Three Frequencies," GPS Solutions, vol. 3, #4, 2000, p. 1-9.*
Han, S. et al, "The Impact of Two Additional Civilian GPS Frequencies on Ambiguity Resolution Strategies," www.gmat.unsw.edu.au/snap/publications/han_etal1999a.pdf , 1999.*

(Continued)

*Primary Examiner*—Gregory C Issing
(74) *Attorney, Agent, or Firm*—Workman Nydegger (57) ABSTRACT

The invention relates to a satellite-based positioning system in which a transmitter (2) emits electromagnetic radiation at least at $N \geq 3$ carrier frequencies (3, 4, 5). In order to resolve the phase ambiguity for said satellite-based positioning system, the electromagnetic radiation is received by a receiver (1), and K pseudo paths (3a, 4a, 5a, 6a) and L carrier phases (3b, 4b, 5b, 6b), especially at least two pseudo paths (3a, 5a) and at least two carrier phases (3b, 4b), are derived from the received radiation as M pieces of distance data, wherein $M=K+L$. In order to determine the position, the integer phase ambiguity is derived from the linear combination of a maximum of $M \leq 2N-1$ pieces of distance data.

13 Claims, 2 Drawing Sheets

OTHER PUBLICATIONS

Euler et al: "On optimal filtering of GPS dual frequency observations without using orbit information," Bulletin Géodésique (1991) 65: 130-143.

Vollath et al: "Analysis of Three-Carrier Ambiguity Resolution Technique for Precise Relative Positioning in GNSS-2," Navigation, Inst. of Nav., vol. 46, No. 1, pp. 13-23.

Jung et al: "Optimization of Cascade Integer Resolution with Three Civil Frequencies," Proceedings of the Inst. of Nav., Sep. 19, 2000.

Wuebbena: "GPS Carrier Phases and Clock Modeling," in Groten, E. and Strauss, R., "GPS-Techniques Applied to Geodesy and Surveying," Springer Verlag, Heidelberg, ISBN 354050267X, 1988, pp. 381-392.

Ulrich Vollath "The Factorized Multi-Carrier Ambiguity Resolution (FAMCAR) Approach for Efficient Carrier-Phase Ambiguity Estimation" 17th International Technical Meeting of the Satellite Division of the Institute of Navigation, ION GNSS 2004, Sep. 21-24, pp. 2499-2508, XP009056324, Long Beach CA.

Shaowei Han, et al "The Impact of Two Additional Civilian GPS Frequencies on Ambiguity Resolution Strategies" Proceedings of the ION 55th Annual Meeting, Institute of Navigation, Jun. 28-30, 1999, pp. 315-321, XP002314346, Cambridge MA.

Patrick Y. Hwang, et al "Enhanced Differential GPS Carrier-Smoothed Code Processing Using Dual Frequency Measurements" Proceedings of the Institute of Navigation (ION) GPS, XX, XX, Sep. 18, 1998, pp. 461-470, XP002330223.

Dah-Jing Jwo "Improved Accuracy and Divergence Correction for the GPS Carrier-Smoothed-Code Processing" Journal of the Chinese Institute of Electrical Engineering, vol. 7, No. 4 (Nov. 2000), pp. 239-248, XP009055743.

\* cited by examiner

PHASE AMBIGUITY RESOLUTION METHOD FOR A SATELLITE BASED POSITIONING SYSTEM

The invention relates to a phase ambiguity resolution method for a satellite-based positioning system, the method comprising the following acts: transmitting electromagnetic radiation by a transmitting unit, the electromagnetic radiation having N carrier frequencies with at least one first carrier frequency, one second carrier frequency, and one third carrier frequency, where N>=3; receiving the electromagnetic radiation by a receiving unit; deriving in a derivation act K pseudo-paths and L carrier phases as M distance data, where M=K+L, from the received radiation; and resolving an integral phase ambiguity from a linear combination of the carrier phases and the pseudo-paths for the position determination. The invention relates to a computer product.

BACKGROUND

For position determination, global or satellite-based positioning systems GNSS (e.g. GPS, GLONASS, GALILEO, etc.) are currently being used for many applications and will be in the future. For this purpose, the satellites of the space segment emit electromagnetic radiation at a plurality of carrier frequencies. In general, one or more codes which serve for the transmission of data are superposed on these carrier frequencies by modulation.

The electromagnetic radiation is detected by a receiver and evaluated with regard to different variables for position determination. Thus, on the basis of the transit times of the signals from a satellite to the receiver, so-called pseudo-paths are determined, these deviating from the true distance owing to various influences, such as, for example, owing to the difference between true system time and the respective representations in the satellite and receiver clocks. These pseudo-path measurements are based on the code which is superposed on a carrier frequency by modulation and contains data about the time of emission of the signal by the satellite. The satellite signals are transmitted at a plurality of carrier frequencies which are designated, for example for the GPS system, by L1 (154·10.23·10$^6$ Hz), L2 (120·10.23·10$^6$ Hz) or L5 (115·10.23·10$^6$ Hz). In the case of GALILEO, for example, the corresponding frequencies are designated as E1-L1-E2 and E5a (L5), E6 at (125·10.23·10$^6$ Hz) being available as a third signal. Other frequencies can likewise be measured in the case of GALILEO.

A further possibility for distance determination consists in the use of carrier phase data of the signals. The measurement of the phase shift is carried out, the use of the carrier phases permitting a precise position determination. However, the disadvantage of the phase measurements is that their distance is determined only to a multiple of the wavelength used, which is designated as phase ambiguity. If these phase ambiguities were known, so-called phase paths as highly accurate equivalents to the pseudo-paths would have been available —based on the carrier phases. Phase paths are obtained by multiplication of the observations with the aid of the carrier phases in cycles with the wavelength applicable in each case.

By utilizing two frequencies, it was originally intended to correct ionospheric transit time delays, but special combination phases can also be generated by linear combinations, such as, for example, ionosphere- or geometry-free linear combinations. Such linear combinations, i.e. in general a summation of any desired multiples of n elements $x_i$ to be combined, i.e.

$$x = \sum_{i=1}^{n} a_i x_i \qquad (0)$$

with the associated positive or negative coefficients $a_i$ and optionally additive terms independent of the elements, may be generated for pseudo paths as well as observations of the carrier phases, i.e. the phase paths. For this purpose, the corresponding observations are multiplied by certain factors. For generating a geometry- or ionosphere-free linear combination, real-value factors are used. The real-value factors destroy the integral nature of the phase ambiguity for the exact determination in an algorithm. If integral factors are used in the linear combinations, the integral nature is retained for the determination within an algorithm.

The combination of carrier phases and pseudo-paths at both wavelengths for resolving so-called "wide lanes" was developed in the 1980s. A first, civil GPS receiver with pseudo-path measurement at both frequencies was on the market at that time. This receiver used the still unencrypted P-code, both at the L1 frequency and at the L2 frequency. The measured pseudo-paths were substantially more accurate than pseudo-path measurements with the aid of the C/A code (300 m wavelength), owing to the shorter code wavelength of about 30 metres. L1 and L2 pseudo-paths as well as L1 and L2 carrier phase measurements were recorded. In the case of the "wide lanes", only integral factors are used and hence the possibility of the advantageous determination of integral phase ambiguities is retained.

The principle of the combination of the observations of two frequencies consists in the elimination of the terms common to all observations, combinations of oblique paths to the satellite, troposphere and the like and of the dispersive, ionospheric term which has a different sign for pseudo-paths and phase measurements. While in general resolution is effected only for the advantageous wide lane, the method can be set up for any desired linear combinations of two frequencies. It should be noted here that the resolution of the wide lanes between a station and a satellite is possible only in theory. Between the frequencies, different clock errors in the satellite and the receiver hinder this possibility. For this reason, a resolution can be effected only after the formation of so-called double differences between two satellites and two receivers or the introduction of the respective clock differences.

This approach of using two frequencies and the measurements of the coordinated carrier phases and pseudo-paths combines the accuracy possible in principle with the carrier phase with the determination of the phase ambiguity, which is possible by the pseudo-path measurement. The so-called Melbourne-Wübbena approach, in which phase and pseudo-path measurement are combined in a system of equations to be solved permits a direct resolution. Here, the carrier phase measurements are stated as phase paths, i.e. in metric units instead of cycles otherwise usually used—the so-called phase path is obtained by multiplication with the wavelength of the respective carrier phase.

Another approach is based on the modeling of the phase paths for the two carrier frequencies according to $$\phi_1 = \rho - \frac{I}{f_1^2} + N_1 \lambda_1 + \varepsilon_{\phi_1} \qquad (1)$$

-continued $$\phi_2 = \rho - \frac{I}{f_2^2} + N_2\lambda_2 + \varepsilon_{\phi_2} \quad (2)$$

and the pseudo-paths according to $$R_1 = \rho + \frac{I}{f_1^2} + \varepsilon_{R_1} \quad (3)$$

$$R_2 = \rho + \frac{I}{f_2^2} + \varepsilon_{R_2} \quad (4)$$

where, with i=1,2, $\phi_i$ designates a phase path coordinated with the i th carrier frequency, $R_i$ designates the i th pseudo-path, $\rho$ designates the geometric path between satellite and receiving unit, in particular including clock errors and non-dispersive error terms, $I/f_i^2$ designates an ionospheric influence for the i th carrier frequency, $N_i$ designates a phase ambiguity for the wavelength $\lambda_i$ coordinated with the i th carrier frequency, $\varepsilon_{\phi_i}$ designates a noise term for the phase path coordinated with i th carrier frequency and $\varepsilon_{R_i}$ designates a noise term for the i th pseudo-path. The solution of a corresponding system of equations includes the determination of the phase ambiguities $N_i$ or a linear combination $$G(N_i) = A + \sum_{i=n}^{n} b_i N_i$$

of the phase ambiguities $N_i$ with a term A independent of the phase ambiguities so that a corresponding position determination is possible.

The direct, numerical combination of these four observations permits the resolution of the ambiguities of the difference between the two carrier phase measurements. Under certain circumstances, the results must be accumulated over a certain time in order to permit a unique resolution, i.e. the mean value of the calculated wide lanes is determined. This is because the pseudo-path measurements are generally too inaccurate. Another possibility consists in the use of a Kalman filter in which the observations are modeled in the simplest manner. Use of filters is explained, for example, in Euler, Hans-Jürgen and Goad, Clyde C., "*On optimal filtering of GPS dual frequency observations without using orbit information*", Bulletin Géodésique (1991) 65:130-143.

All these methods constitute a method for pre-processing the observations, i.e. the pseudo-paths and phase paths, these generally being used for the convergence of phase ambiguities. In general, these methods can be applied to raw undifferentiated observations or all differences described in the literature, such as double differences. If raw observations or a small differentiation level are used as the customary double difference between receivers and satellites, phase ambiguities in a double difference must be determined for a precise, differential position determination, since these integral values can be determined only in the double difference. This is necessary owing to still existing errors, for example satellite and receiver clock errors. By the combination of two carrier phase measurements, which are expressed as phase paths in equations (1) and (2), and the two pseudo-path measurements in equations (3) and (4) with subsequent double differentiation, the phase ambiguities can be determined and specified for widelanes without inclusion of the geometry, i.e. calculation of the position of the satellites and of the receiver. Here, the advantage of the widelane lies in this method. There, and as long as two identical satellites at two arbitrary locations are visible, the fixing can be carried out without actual determination of only locally correlating variables.

By using the two frequencies for the common derivation of all phase paths and pseudo-paths, the achievable accuracy is in principle limited to the two frequencies. An independent improvement or optimization of phase path or pseudo-path measurement cannot be performed. In addition carrier frequencies which are both coded and can be evaluated with respect to their phases with required accuracy are always required.

Owing to the observation types available in the system, corresponding methods of the prior art are always based on identical frequencies for pseudo-paths and phase paths. With the advent of discussions on extended or new satellite positioning systems and the greater number of available measurement frequencies, further methods were developed which in each case use pseudo-paths and phase paths of the frequencies appropriate in each case, i.e. always both these distance data.

A three-frequency method of the prior art is described, for example, in Vollath et al., "*Analysis of Three-Carrier Ambiguity Resolution Technique for Precise Relative Position in GNSS-2*", Navigation, Inst. of Nav., vol. 46, no. 1, pages 13-23. In this method, observations of three frequencies with the indices 1, 2 and 4 are used simultaneously for pseudo-paths and phase paths. The approach aims at splitting into geometry- and ionosphere-free multi-frequency solutions but always uses both variables measured per carrier frequency, i.e. pseudo-path and carrier phase.

US 2005/0080568 describes a method for resolving phase ambiguities, in which three GPS frequencies are likewise used. Here too pseudo-paths corresponding to the respective phase observations are always used.

A similar approach with phase paths and pseudo-paths based on identical frequencies is described in Jung et al., "*Optimization of Cascade Integer Resolution with Three Civil Frequencies*", Proceedings of the Inst. of Nav., 19.09.2000.

SUMMARY

The object of the present invention is to provide a method for resolving phase ambiguities, as can be used, for example, for a satellite-based positioning system, which method permits a higher accuracy compared with the prior art with short initialization times or shorter initialization times for a specified accuracy.

A further object is to provide a method having high flexibility and improved use of satellite signals, in particular of space segments of different operators.

These objects are achieved, according to the invention, by the methods or subjects of the first claim and by the characterizing features of the dependent claims or the achievements are further developed.

The invention relates to a phase ambiguity resolution method for a satellite-based positioning system according to the first claim and a corresponding computer program product including program code stored on a machine-readable medium, the program code being configured to cause an electronic device to carry out the phase ambiguity resolution method according to the first claim.

The basis of the concept according to the invention is that the phase ambiguity is resolved or determined by not always measuring both pseudo-path and carrier phase for all carrier frequencies which are present or can be evaluated or using both said pseudo-path and said carrier phase for the resolution. This is advantageous under certain circumstances if, for example, a phase without a modulated-on code is available or if a code is superposed by modulation but is not available for a pseudo-path measurement. The non-use of a code for pseudo-path measurement may also be desired, for example owing to necessary license costs. Furthermore, pseudo-path measurements can be carried out more accurately with the use of certain codes than with the aid of other codes. Pseudo-paths and carrier phases of selected carrier frequencies are used so that the linkage of the two distance data with one another and with the respective carrier frequency, which was required to date, is abandoned. In general formulation, of N carrier frequencies with N≧3 i.e. with at least one first, second and third carrier frequency, with derivation of K pseudo-paths and L carrier phases as M distance data with M=K+L, from the received radiation, not more than M≦2N−1 distance data are therefore used.

In the case of three carrier frequencies, this means a combination of two frequencies of the carrier phases with at least one further frequency for the measured pseudo-paths. One or both used for the determination of the pseudo-path may differ from those used for the carrier phase measurement.

This approach permits, for example, the realization of various advantages:

It is possible to carry out carrier phase measurements for frequencies at which no pseudo-paths are measured or at which pseudo-paths are not measurable, for example since no coding is present or this cannot be evaluated.

Combination of pseudo-path measurements, the inherent accuracy of measurement of which is significantly higher as a result of the system, can be effected.

Combination with pseudo-paths, the accuracy of which is higher than at other frequencies owing to smoothing with the aid of carrier phase measurements, is possible. This can have a positive effect, for example, with regard to the elimination of cycle errors. Thus, pseudo-paths can be smoothed with carrier phase measurements which do not correspond to the carrier phases used for resolving the system of equations.

Linear combination methods using two phase paths or pseudo-paths are described in the prior art. The linear combination can be used both explicitly, as described, for example, in Wübbena, Gerhard, *"GPS Carrier Phases and Clock Modeling"* in Groten, E. and Strauss, R., *"GPS-Techniques Applied to Geodesy and Surveying"* Springer Verlag, Heidleberg, ISBN 354050267X, 1988, or implicitly, i.e. in conjunction with or after further steps, for example filtering, as described in Euler, Hans-Jürgen and Goad, Clyde., *"On optimal filtering of GPS dual frequency observations without using orbit information"*, Bulletin Géodésique (1991) 65, pages 130-143.

With the modernization of GPS, a third wavelength with carrier phase and possibly also coding will be available in the future. Explicit and implicit methods can then be used according to the invention in combinations of the first with the third or second with the third carrier phase and the respective pseudo-path measurements. The new European satellite system GALILEO will likewise emit signals at more than two frequencies. Similar plans also exist for the Russian GLONASS.

In order to be able to improve the accuracy of the pseudo-path measurements, it is also possible to carry out a smoothing of the pseudo-path. A difference of pseudo-path and phase path is used for this purpose:

$$R_i - \phi_i = 2\frac{I}{f_i^2} - \lambda_i N_i - \varepsilon_{\phi_i} + \varepsilon_{R_i} \quad (5)$$

where $$\phi_i = \rho - \frac{I}{f_i^2} + \lambda_i N_i + \varepsilon_{\phi_i}$$

$$R_i = \rho + \frac{I}{f_i^2} + \varepsilon_{R_i}.$$

As long as the carrier phase and hence the associated phase path are not disturbed by cycle errors, the measurement noise of the difference and hence of the pseudo-paths can be reduced by a simple calculation of the mean. This method is used, for example, in the case of signal-frequency receivers, i.e. carrier phase and pseudo-paths can only be measured at the same frequency. However, the changes in the ionosphere as a function of time and the different signs of the influences for phase paths and pseudo-paths caused by the dispersion constitute an obstacle with respect to the length of the time interval of averaging. Usually, an attempt is made to filter for no longer than one minute.

In order nevertheless to achieve divergence-free smoothing of pseudo-paths, it is possible according to the invention to form any desired linear combinations of carrier phase measurements, the changes of which exactly correspond to the changes of pseudo-paths, which means a reversal of the dispersion-related sign of the ionospheric influence. None of the carrier phase frequencies used need agree with the frequency of the pseudo-paths to be smoothed. Simple differences between the carrier phases and the pseudo-path then substantially contain only the noise term of the pseudo-paths. This noise term can be averaged over time, and a smoothed pseudo-path is obtained by back-substitution.

By a suitable choice of factors for two phase paths, it is possible to produce a linear combination whose changes as a function of time correspond to the one selected pseudo-path. For smoothing a pseudo-path, it is possible, in the case of measurements of three or more carrier frequencies, to form the modified phase path with rotated sign of the ionospheric term from carrier phases whose frequencies do not correspond to the pseudo-path to be smoothed. This has an advantage if the carrier phase with the same frequency as the pseudo-path to be smoothed has a cycle error. In such a case, the averaging would otherwise inevitably have to be reinitialized.

The linear combination can be described, for example, according to $$\phi_1^* = F(\phi_1, \phi_2) = \rho + \frac{I}{f_1^2} + G(N_1, N_2) + \varepsilon_{\phi_1}^* \quad (6)$$

where $\phi_1$ and $\phi_2$ each designate a phase path coordinated with a first or second carrier frequency, $F(\phi_1, \phi_2)$ designates a linear combination of the phase paths, $G(N_1, N_2)$ designates a linear combination of the phase ambiguities and $\varepsilon_{\phi_i}^*$ designates a noise term for the linear combination.

The difference between linear combination and at least one pseudo-path coordinated with the third or further carrier frequency is calculated according to $$R_k - \phi_1^* = -G(N_1, N_2) - \varepsilon_{\phi_1}^* + \varepsilon_{R_k} \quad (7)$$

where $R_k$ is a pseudo-path of the third or further carrier frequency and $\epsilon_{Rk}$ is the coordinated noise term.

In contrast to the method described above, the time interval for the smoothing can in principle be chosen to be arbitrarily long since there are no time-dependent variables on the right.

Suitable factors $\gamma^*$ and $\delta^*$ for generating a phase combination solution—for the phase measurements of a first and of a second carrier frequency $f_1$ and $f_2$—with rotated signs for a pseudo-path which is coordinated with a third carrier frequency $f_3$ can be formulated as follows $$\gamma^* = \frac{f_2^2}{f_2^2 - f_1^2} \tag{8}$$

$$\delta^* = -\frac{f_2^2}{f_2^2 - f_1^2}$$

With $$\phi_{Iono1} = \phi_1 \gamma^* - \phi_2 \delta^* \tag{9}$$

and $$\phi_{Iono3} = \frac{f_1^2}{f_3^2} \phi_{Iono1} \tag{10}$$

$$\phi_{Iono3} = -\frac{I}{f_3^2} + \lambda_1 N_1 \frac{f_2^2}{f_2^2 - f_1^2} \frac{f_1^2}{f_3^2} - \lambda_2 N_2 \frac{f_2^2}{f_2^2 - f_1^2} \frac{f_1^2}{f_3^2}$$

it follows that the modified phase path for the third carrier frequency is a linear combination of the phase paths according to $$\phi_3^* = F(\phi_1, \phi_2) = \phi_1 - \phi_{Iono1} - \phi_{Iono3} \tag{11}$$

where this can be written out in full as follows:

$$\phi_3^* = \rho - \frac{I}{f_1^2} + \lambda_1 N_1 - \left( -\frac{I}{f_1^2} + \lambda_1 N_1 \frac{f_2^2}{f_2^2 - f_1^2} - \lambda_2 N_2 \frac{f_2^2}{f_2^2 - f_1^2} \right) - \tag{12}$$

$$\left( -\frac{I}{f_3^2} + \lambda_1 N_1 \frac{f_2^2}{f_2^2 - f_1^2} \frac{f_1^2}{f_3^2} - \lambda_2 N_2 \frac{f_2^2}{f_2^2 - f_1^2} \frac{f_1^2}{f_3^2} \right)$$

and $$\phi_3^* = \rho + \frac{I}{f_3^2} + \lambda_1 N_1 - \left( \lambda_1 N_1 \frac{f_2^2}{f_2^2 - f_1^2} - \lambda_2 N_2 \frac{f_2^2}{f_2^2 - f_1^2} \right) - \tag{13}$$

$$\left( \lambda_1 N_1 \frac{f_2^2}{f_2^2 - f_1^2} \frac{f_1^2}{f_3^2} - \lambda_2 N_2 \frac{f_2^2}{f_2^2 - f_1^2} \frac{f_1^2}{f_3^2} \right)$$

On the basis of equation (7), the following may therefore be stated as a linear combination of the phase ambiguities $$G(N_1, N_2) = +\lambda_1 N_1 - \lambda_1 N_1 \frac{f_2^2}{f_2^2 - f_1^2} + \tag{14}$$

$$\lambda_2 N_2 \frac{f_2^2}{f_2^2 - f_1^2} - \lambda_1 N_1 \frac{f_2^2}{f_2^2 - f_1^2} \frac{f_1^2}{f_3^2} + \lambda_2 N_2 \frac{f_2^2}{f_2^2 - f_1^2} \frac{f_1^2}{f_3^2}$$

$$G(N_1, N_2) = +\lambda_1 N_1 - \lambda_1 N_1 \frac{f_2^2}{f_2^2 - f_1^2} - \lambda_1 N_1 \frac{f_2^2}{f_2^2 - f_1^2} \frac{f_1^2}{f_3^2} +$$

$$G(N_1, N_2) = \lambda_1 N_1 \left( 1 - \frac{f_2^2}{f_2^2 - f_1^2} - \frac{f_2^2}{f_2^2 - f_1^2} \frac{f_1^2}{f_3^2} \right) +$$

$$\lambda_2 N_2 \left( \frac{f_2^2}{f_2^2 - f_1^2} + \frac{f_2^2}{f_2^2 - f_1^2} \frac{f_1^2}{f_3^2} \right)$$

This expression has the intended basic independence of time-related changes.

In an application expressed in concrete form by way of example, the carrier frequencies $f_1$ and $f_2$ may correspond to the GPS frequencies L1 and L2, and the third carrier frequency $f_3$ may correspond to the GPS frequency L5.

BRIEF DESCRIPTION OF THE DRAWINGS

The phase ambiguity resolution method according to the invention is described in more detail below, purely by way of example, with reference to working examples shown schematically in the drawing. Specifically.

DETAILED DESCRIPTION

Figure 1:
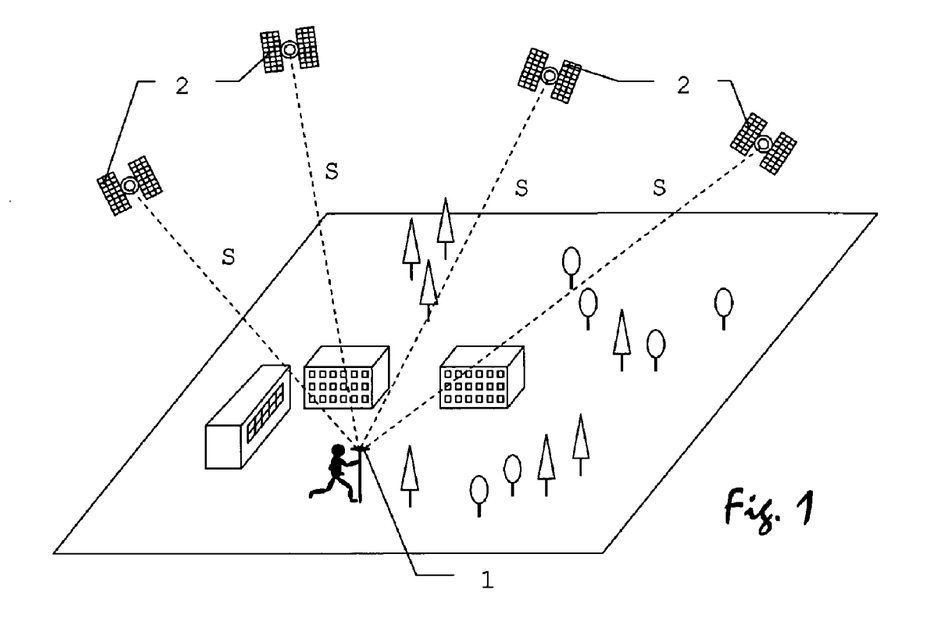
FIG. 1 shows an explanatory diagram of the position determination by means of a global positioning system according to the prior art.

FIG. 1 explains the position determination using a global positioning system according to the prior art.

A receiving unit 1 for a global, satellite-based positioning system receives the electromagnetic radiation S emitted by satellites 2 as a transmitting unit and evaluates the radiation S with regard to its inherent properties, such as, for example, carrier phases, and properties superposed by modulation, such as, for example, a code. As a rule, lines of sight or received signals of at least four satellites 2 are required for a sufficiently accurate position determination.

Figure 2:
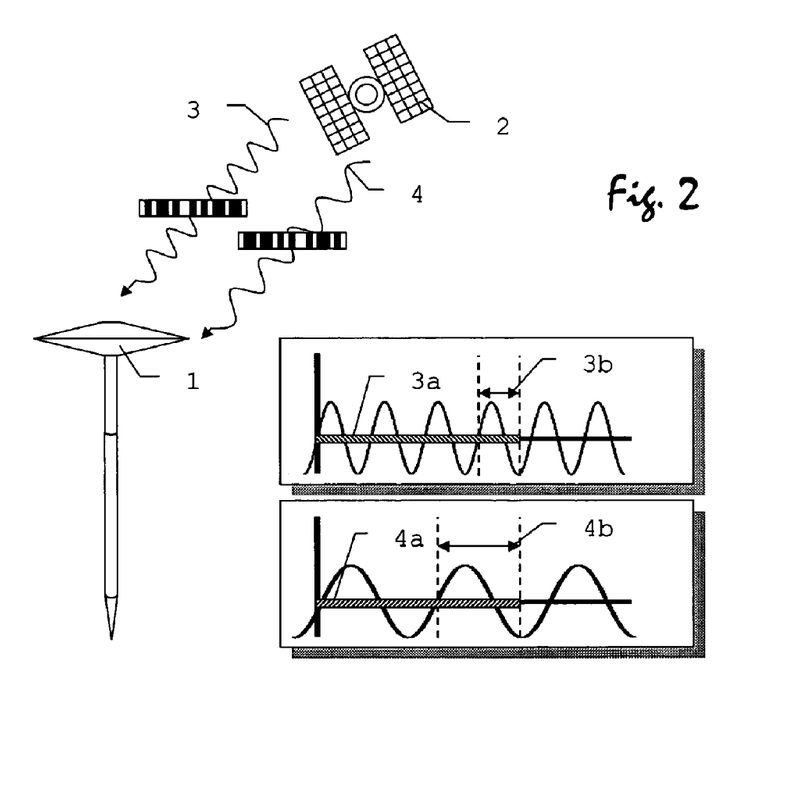
FIG. 2 shows a schematic diagram of the position determination with direct resolution of the phase ambiguity by using two carrier frequencies according to the prior art.

For correction of various errors or influences, such as, for example, ionospheric delays or clock differences between satellites 2 and receiving unit 1 at least two carrier frequencies are generally evaluated with regard to two variables. FIG. 2 schematically shows such a use of two carrier frequencies with direct resolution of the phase ambiguity according to the prior art. Here, the receiving unit 1 analyses the signals of a first carrier frequency 3 and of a second carrier frequency 4 or their coordinated wavelengths. On the basis of the superposed code, pseudo-paths 3a and 4a which are coordinated with the respective carrier frequencies and represent the distance from a receiving unit 1 to the satellites 2 via a transit time determination can be derived. However, this distance is still falsified by clock errors. At the same time, the phase shifts or carrier phases 3b and 4b are determined for the two carrier frequencies relative to an internal reference signal. These carrier phases 3b and 4b represent a distance and are precise but still associated with a phase ambiguity to be resolved, it being possible, by double difference calculation, to dispense with an actual determination of the distance for resolving this phase ambiguity. From the combination of pseudo-paths 3a and 4a and phase paths coordinated with the carrier phases 3b and 4b as a metric equivalent, or their differences, the ambiguity can be directly resolved and errors eliminated. In the prior art, in each case the same two carrier frequencies, for example L1 and L2 in the case of GPS, are used for phase measurement and determination of the pseudo-paths.

Figure 3:
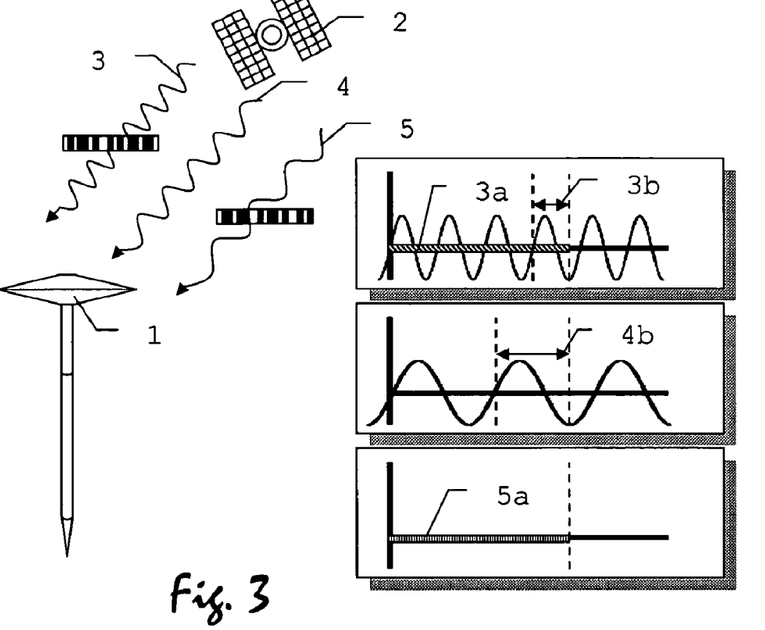
FIG. 3 shows a schematic diagram of a first working example of the method according to the invention with three carrier frequencies and FIG. 4 shows a schematic diagram of a second working example of the method according to the invention with four carrier frequencies.

FIG. 3 shows a schematic diagram of a first working example of the method according to the invention with a third carrier frequency 5. In this example, the first carrier frequency 3 and the third carrier frequency 5 now carry a coding, whereas the second carrier frequency 4 is emitted without a code or the code cannot or should not be used. According to the invention, all three carrier frequencies are now used with regard to their inherent information. With respect to the uncoded second carrier frequency 4 or second carrier frequency 4 measured without coding, the carrier phase 4b is measured. The third carrier frequency 5 on the other hand is analyzed with regard to the pseudo-path 5a, whereas both pseudo-path 3a and carrier phase 3b are derived and measured, respectively, for the first carrier frequency 3. By using a further carrier frequency, it is possible to utilize carrier frequencies which are better suitable also with regard to their physical conditions, for example the frequency-dependent ionospheric delay, even if they do not carry both data, i.e. phase and pseudo-path. Thus, the flexibility in the choice of useable carrier frequencies is increased via the method according to the invention compared with the prior art. The separability of phase and pseudo-path which is now possible in principle permits an improvement of the position determination. By optimization of the physical or algorithmic conditions, increased accuracy can be achieved, for example by choosing a more precise or smoothed pseudo-path.

Figure 4:
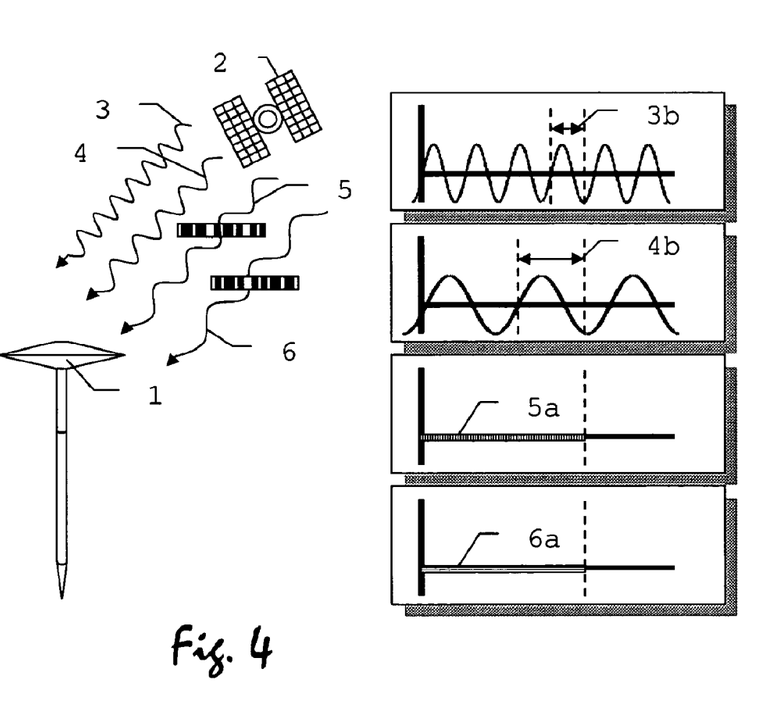

Complete separation of phase and pseudo-paths in the form of a second working example of the method according to the invention with four carrier frequencies is shown in FIG. 4. In this example, the satellite 2 emits radiation with four different carrier frequencies. Here, the first and second carrier frequencies 3 and 4 are emitted without coding or measured without coding and the third and fourth carrier frequencies 5 and 6 are emitted with a code. The measurement of carrier phases 3b and 4b is effected for the short-wave and precise first and second carrier frequencies 3 and 4, whereas a measurement of the pseudo-paths 5a and 6a is carried out for the comparatively low-frequency third and fourth carrier frequencies 5 and 6. By means of the method according to the invention, it is thus possible to carry out the measurements in the frequency ranges which are advantageous in each case. Independently of this development, however codings distributed over the various carrier frequencies can also be evaluated in any desired manner.

The carrier phase shown in the figures does not physically correspond exactly to the measurement actually carried out relative to a reference phase. For reasons of clarity, the carrier phases and the ambiguity term are related directly to the pseudo-path. In addition, in spite of the chosen system-specific examples, the method can in principle also be used according to the invention for any desired generic satellite-based positioning systems, such as, for example, GPS, GALILEO or GLONASS. In particular, the designations "first" carrier frequency, "second" carrier frequency, etc. are not necessarily identical to designations such as L1, L2, etc. For example, the "first" carrier frequency may also represent L5, the "second" L1 and the "third" L2. Furthermore, the frequency sequences or series chosen purely by way of example in the figures for the carrier frequencies are not to be regarded as being limiting.

I claim:

1. A phase ambiguity resolution method for a satellite-based positioning system, the method comprising the following acts:
   transmitting electromagnetic radiation by a transmitting unit, the electromagnetic radiation having N carrier frequencies with at least one first carrier frequency, one second carrier frequency, and one third carrier frequency, where $N \geq 3$;
   receiving the electromagnetic radiation by a receiving unit;
   deriving in a derivation act K pseudo-paths and L carrier phases as M distance data, where M=K+L, from the received radiation; and
   resolving an integral phase ambiguity from a linear combination of the carrier phases and the pseudo-paths for the position determination, wherein not more than $M \leq 2N-1$ distance data are used; and wherein:
      at least two pseudo-paths and at least two carrier phases are used as distance data, and the first and second carrier phases, respectively associated with the first carrier frequency and the second carrier frequency and defining first and second distance data, and at least one of the two pseudo-paths, associated with the third carrier frequency and defining a third distance data, are linearly combined.

2. A phase ambiguity resolution method according to claim 1, wherein the derivation act comprises solving the following set of equations:

$$\phi_1 = \rho - \frac{I}{f_1^2} + N_1\lambda_1 + \varepsilon_{\phi_1}$$

$$\phi_2 = \rho - \frac{I}{f_2^2} + N_2\lambda_2 + \varepsilon_{\phi_2},$$

$$R_1 = \rho + \frac{I}{f_1^2} + \varepsilon_{R_1},$$

$$R_3 = \rho + \frac{I}{f_3^2} + \varepsilon_{R_3},$$

where, with i=1, 2, 3,
   $\phi_i$ designates a phase path coordinated with a i th carrier phase as a measured variable;
   $R_i$ designates the i th pseudo-path as a measured variable;
   $\rho$ designates a geometrical path between the transmitting unit and the receiving unit including clock errors and non-dispersive error terms;
   $I/f_i^2$ designates an ionospheric influence for the specified i th carrier frequency;
   $N_i$ designates a phase ambiguity for the wavelength $\lambda_i$ associated with the i th carrier frequency;
   $\varepsilon_{\phi i}$ designates a noise term for the phase path associated with the i th carrier frequency; and
   $\varepsilon_{Ri}$ designates a noise term for the i th pseudo-path, the solution comprising a determination of the phase ambiguities $N_i$.

3. A phase ambiguity resolution method according to claim 1 wherein:
   the electromagnetic radiation has a fourth carrier frequency; and a fourth distance data is defined by a pseudo-path associated with the fourth carrier frequency, and the first, second, third and fourth distance data are linearly combined.

4. A phase ambiguity resolution method according to claim 3, wherein the first and the second carrier phases and the two pseudo-paths are linearly combined upon solving the following set of equations:

$$\phi_1 = \rho - \frac{I}{f_1^2} + N_1\lambda_1 + \varepsilon_{\phi_1},$$

$$\phi_2 = \rho - \frac{I}{f_2^2} + N_2\lambda_2 + \varepsilon_{\phi_2},$$

$$R_3 = \rho + \frac{I}{f_3^2} + \varepsilon_{R_3},$$

$$R_4 = \rho + \frac{I}{f_4^2} + \varepsilon_{R_4},$$

where, with i=1, 2 and j=3, 4,
- $\phi_i$ designates a phase path associated with the i th carrier frequency as a measured variable;
- $R_j$ designates the j th pseudo-path as a measured variable;
- $\rho$ designates a geometrical path between the transmitting unit and the receiving unit, including clock errors and non-dispersive error terms;
- $I/f_i^2$ designates an ionospheric influence for the specified i th carrier frequency;
- $I/f_j^2$ designates an ionospheric influence for the specified j th carrier frequency;
- $N_i$ designates a phase ambiguity for the wavelength $\lambda_i$ associated with the i th carrier frequency;
- $\varepsilon_{\phi i}$ designates a noise term for the phase path associated with the i th carrier frequency; and
- $\varepsilon_{Rj}$ designates a noise term for the j th pseudo-path, the solution comprising a determination of the phase ambiguities $N_i$.

5. A phase ambiguity resolution method according to claim 4, further comprising smoothing at least one of the two pseudo-paths.

6. A phase ambiguity resolution method according to claim 5, wherein smoothing of at least one of the two pseudo-paths is accomplished by calculation of the mean value of differences of the at least one pseudo-path and a phase path coordinated with the first or second carrier phase.

7. A phase ambiguity resolution method according to claim 4, wherein a linear combination $\phi^*$ of the pseudo-paths is formed from the first and second carrier phases in such a way that a positive algebraic sign results for ionospheric terms, so that the changes in the phase paths correspond to the changes in the pseudo-paths.

8. Phase ambiguity resolution method according to claim 7, wherein the linear combination $\phi^*$ is effected according to the following relationship:

$$\phi^* = F(\phi_1, \phi_2) = \rho + \frac{I}{f_k^2} + G(N_1, N_2) + \varepsilon_\phi^*$$

in which,
- $\phi_1$ designates a phase path associated with the first carrier frequency;
- $\phi_2$ designates a phase path associated with the second carrier frequency;
- $F(\phi_1,\phi_2)$ designates a linear combination:

$$F(\phi_1,\phi_2) = B + \sum_{i=1}^{2} b_i\phi_i$$

of the phase paths with coefficients $b_i$ and a term B independent of the phase paths;
- $\rho$ designates a geometrical path between the transmitting unit and the receiving unit including clock errors and non-dispersive error terms;
- $I/f_k^2$ designates an ionospheric influence for the carrier frequency to be smoothed, where k∈{1,2,3,4};
- $N_1$ designates a phase ambiguity for the specified wavelength $\lambda_1$ associated with the first carrier frequency;
- $N_2$ designates a phase ambiguity for the specified wavelength $\lambda_2$ associated with second carrier frequency;
- $G(N_1,N_2)$ designates a linear combination:

$$G(N_1, N_2) = A + \sum_{i=1}^{2} a_i N_i$$

with coefficients $a_i$ and a part A independent of the phase ambiguities; and
- $\varepsilon_\phi^*$ designates a noise term for the linear combination, the resolution comprising a determination of the linear combination $G(N_1,N_2)$ of the phase ambiguities $N_i$.

9. A phase ambiguity resolution method according to claim 8, wherein the linear combination $\phi^*$ is formed according to $$\phi^* = -\frac{I}{f_k^2} + \lambda_1 N_1 \frac{f_2^2}{f_2^2 - f_1^2}\frac{f_1^2}{f_k^2} - \lambda_2 N_2 \frac{f_2^2}{f_2^2 - f_1^2}\frac{f_1^2}{f_k^2}$$

in which $f_1$ and $f_2$ designate the first and second carrier frequencies and $f_k$ designates the carrier frequency coordinated with the pseudo-path to be smoothed, where k∈{1,2,3,4}.

10. A phase ambiguity resolution method according to claim 9, further comprising calculating the difference between the linear combination $\phi^*$ and at least one of the two pseudo-paths.

11. A phase ambiguity resolution method according to claim 10, wherein the difference is calculated according to the following relationship:

$$R_k - \phi^* = -G(N_1, N_2) - \varepsilon_{\phi^*} + \varepsilon_{R_k}$$

$$R_k = \rho + \frac{I}{f_k^2} + \varepsilon_{R_k}$$

where, with k∈{3,4},
- $R_k$ designates the pseudo-path of the specified k th carrier frequency;
- $\rho$ designates a geometrical path between a transmitting unit and the receiving unit, including clock errors and non-dispersive error terms;
- $I/f_k^2$ designates an ionospheric influence for the specified k th carrier frequency;

$N_1$ designates a phase ambiguity for the specified wavelength $\lambda_1$ associated with the first carrier frequency;

$N_2$ designates a phase ambiguity for the specified wavelength $\lambda_2$ associated with the second carrier frequency;

$G(N_1,N_2)$ designates a linear combination:

$$G(N_1 N_2) = A + \sum_{i=1}^{2} a_i N_i$$

with coefficients $a_i$ and a part A independent of the phase ambiguities;

$\epsilon_\phi{}^*$ designates a noise term for the linear combination; and $\epsilon_{Rk}$ designates a noise term for the pseudo-path of the k th carrier frequency, the resolution comprising a determination of the linear combination ($G(N_1,N_2)$) of the phase ambiguities $N_i$.

12. A computer program product including program code stored on a machine-readable medium, the program code being configured to cause an electronic device to carry out the phase ambiguity resolution method according to claim 1.

13. A computer program product according to claim 12, wherein the electronic device is a computer.

* * * * *